(12) United States Patent
Taniguchi et al.

(10) Patent No.: US 10,567,261 B2
(45) Date of Patent: Feb. 18, 2020

(54) RELAY DEVICE AND COMMUNICATION NETWORK

(71) Applicant: MITSUBISHI ELECTRIC CORPORATION, Tokyo (JP)

(72) Inventors: Sachiko Taniguchi, Tokyo (JP);
Ryusuke Kawate, Tokyo (JP);
Toshiyuki Nakayasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/761,788

(22) PCT Filed: Nov. 26, 2015

(86) PCT No.: PCT/JP2015/083284
§ 371 (c)(1),
(2) Date: Mar. 20, 2018

(87) PCT Pub. No.: WO2017/090162
PCT Pub. Date: Jun. 1, 2017

(65) Prior Publication Data
US 2018/0270140 A1 Sep. 20, 2018

(51) Int. Cl.
*H04L 12/26* (2006.01)
*H04L 12/46* (2006.01)

(52) U.S. Cl.
CPC ............ *H04L 43/16* (2013.01); *H04L 12/462* (2013.01); *H04L 12/4625* (2013.01); *H04L 43/12* (2013.01)

(58) Field of Classification Search
None
See application file for complete search history.

(56) References Cited

U.S. PATENT DOCUMENTS 7,672,228 B1 * 3/2010 Senevirathne ........ H04L 41/046
370/219
7,836,210 B2 * 11/2010 Yanagihara ............. H04L 45/00
370/256

(Continued)

FOREIGN PATENT DOCUMENTS

JP             5084915 B2    11/2012
WO    WO 2015/075959 A1     5/2015

*Primary Examiner* — Otis L Thompson, Jr.
(74) *Attorney, Agent, or Firm* — Birch, Stewart, Kolasch & Birch, LLP

(57) ABSTRACT

A layer-2 switch, forming a communication network along with a communication terminal, includes a plurality of communication ports, frame identification units to identify a specific frame that is regularly transmitted from the communication terminal in the communication network, a setting unit to set a monitoring cycle and a reception threshold for detecting a loop path in the communication network, a monitoring unit to identify, for each of the communication ports, a plurality of communication terminals that are a source of the specific frame, and to count the number of the specific frames received from each of the communication terminals within the monitoring cycle, and a determination unit to determine whether a loop path is detected for each of the communication ports by comparing a counter value, which indicates the number of the specific frames, with the reception threshold, and to execute control to stop transmission and reception of the frame at the communication port at which a loop path is detected.

12 Claims, 10 Drawing Sheets

(56) References Cited

U.S. PATENT DOCUMENTS

| | | | |
|---|---|---|---|
| 2005/0286430 A1* | 12/2005 | Koga | H04L 12/462 370/241 |
| 2006/0013141 A1* | 1/2006 | Mutoh | H04L 12/462 370/241 |
| 2006/0013143 A1* | 1/2006 | Yasuie | H04L 12/66 370/249 |
| 2008/0062874 A1* | 3/2008 | Shimadoi | H04L 43/00 370/232 |
| 2008/0080398 A1* | 4/2008 | Yasuie | H04L 12/462 370/254 |
| 2008/0126536 A1* | 5/2008 | Sakurai | H04L 12/437 709/224 |
| 2009/0219821 A1* | 9/2009 | Kamachi | H04L 12/437 370/242 |
| 2011/0280145 A1 | 11/2011 | Itoh et al. | |
| 2011/0292837 A1 | 12/2011 | Nakamura et al. | |
| 2011/0317565 A1* | 12/2011 | Krishnamurthi | H04B 17/0085 370/251 |
| 2012/0099480 A1 | 4/2012 | Nakamura et al. | |
| 2012/0185592 A1* | 7/2012 | Nakamura | H04L 41/0866 709/224 |
| 2013/0003601 A1* | 1/2013 | Gupta | H04L 12/462 370/254 |
| 2013/0114400 A1* | 5/2013 | Zhang | H04L 43/16 370/224 |
| 2013/0235722 A1* | 9/2013 | Lund | H04L 45/04 370/230 |
| 2014/0047056 A1* | 2/2014 | Tahara | H04L 69/40 709/208 |
| 2014/0050099 A1* | 2/2014 | Lin | H04L 41/12 370/241 |
| 2014/0204768 A1* | 7/2014 | Chen | H04L 43/50 370/244 |
| 2016/0065502 A1* | 3/2016 | Ikegami | H04L 49/254 370/419 |
| 2016/0173296 A1* | 6/2016 | Ooi | H04L 12/437 370/224 |
| 2016/0254980 A1 | 9/2016 | Nakayasu | |
| 2017/0353328 A1* | 12/2017 | Chickering | H04L 12/437 |
| 2018/0102944 A1* | 4/2018 | Mishra | H04L 45/66 |
| 2019/0028396 A1* | 1/2019 | Fukunaga | H04L 12/4625 |

* cited by examiner

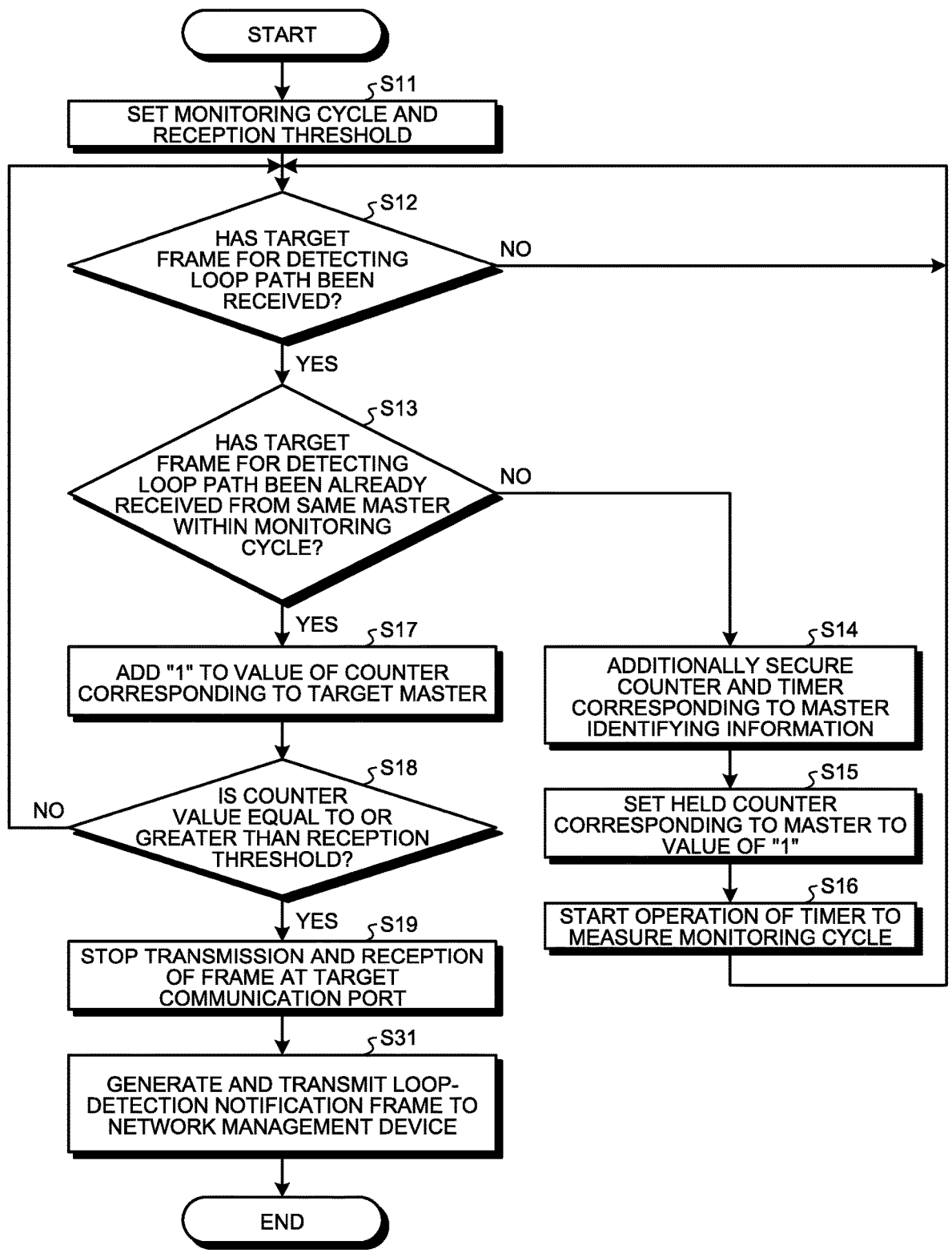

RELAY DEVICE AND COMMUNICATION NETWORK

FIELD

The present invention relates to a relay device that relays a frame to be transmitted and received between communication devices forming a communication network, and relates to the communication network.

BACKGROUND

In the industrial field, the trend towards use of the Ethernet (registered trademark) has grown recently. At the manufacturing site, a communication network that connects Factory Automation (FA) devices such as a Programmable Logic Controller (PLC), an inverter, and a sensor has been constructed (hereinafter, the communication network is referred to as "FA network"). In general, in the FA network, the FA devices for which real-time operation is required are connected and controlled via the Ethernet. As the Ethernet-based FA network, the Control & Communication (CC)-Link IE (registered trademark) is commonly known.

In the CC-Link IE, a communication device (hereafter, "master") that is a controller and a communication device (hereafter, "slave") that is to be controlled are connected via the Ethernet to perform communication in accordance with a token passing method using multicast communication (for example, Patent Literature 1).

According to the communication system described in Patent Literature 1, a master regularly broadcasts a network-existence-confirmation frame to controlled-target slaves. On the basis of connection information of the slave included in an existence-confirmation-response frame from the slaves, the master detects an additional connection terminal and sets a token passing circuit.

After having determined the token passing circuit, the master notifies the slaves of a destination of the token. After having notified the slaves of the token passing circuit, the master multicasts data of its own and the token. A Media Access Control (MAC) address of a slave that is given transmission right for the next time is stored in the multicasted token. The slave, having received the token addressed to itself, recognizes that the slave has acquired the transmission right, transmits data as necessary, and thereafter multicasts the token to the next slave. In the CC-Link IE, the period of time from when the master transmits a token to when the master receives a token addressed to the master is controlled to fall within a preset time. By repeating the series of the processes, the master and the slaves perform cyclic communication that is periodic communication.

In an FA network configured by connecting various types of FA devices to a relay device such as a layer-2 switch, there is a possibility in that a loop path is formed by improperly connecting a communication path due to a human error or the like. In the FA network, a storm is caused by formation of the loop path. This hinders the FA-network operation. The storm refers to an infinite repetition of transfer and replication of a broadcast frame or a multicast frame on the loop path, by which the bandwidth of the FA network becomes insufficient. The FA network is required to be highly reliable and thus required to have a mechanism to autonomously detect and eliminate a loop path.

In the conventional CC-Link IE, a method to detect and eliminate a loop path within the FA network has been proposed. In this method, a relay device uses a network-existence-confirmation frame that is regularly transmitted from a master to determine that a loop path is detected at a port when the number of network-existence-confirmation frames received by the port within a set time is equal to or greater than a threshold, and then blocks this port (for example, Patent Literature 2).

CITATION LIST

Patent Literatures

Patent Literature 1: Japanese Patent No. 5084915
Patent Literature 2: International Publication No. WO2015/075959

SUMMARY

Technical Problem

In the conventional loop-path detection method, a loop path can be detected properly in a case where the CC-Link IE network is configured by including a single master. However, a plurality of masters may be connected to a single CC-Link IE network in some cases. A master that is additionally connected to the CC-Link IE network may output a network-existence-confirmation frame multiple times in a burst mode. In a network connected that includes a plurality of masters, when an additional master is connected to the network, there is a problem in that when the total number of network-existence-confirmation frames received by a port from the masters becomes equal to or greater than a threshold, the relay device may improperly determine that a loop path has been formed at the port even though the number of network-existence-confirmation frames received by this port from a single master is smaller than the threshold, and thus may block the port.

The present invention has been achieved to solve the above problems, and an object of the present invention is to provide a relay device that easily detects a loop path with a simple configuration, and autonomously eliminates the loop path in a network connected with a plurality of masters.

Solution to Problem

A relay device according to an aspect of the present invention includes a plurality of communication ports to transmit and receive a frame to and from a communication terminal and a frame identification unit to identify a specific frame that is regularly transmitted from the communication terminal in the communication network. Further, the relay device includes a setting unit to set a monitoring cycle for monitoring number of the specific frames received by the relay device, and a reception threshold for detecting a loop path in the communication network, a monitoring unit to identify, for each of the communication ports, a plurality of communication terminals that are sources of the specific frames received by the relay device, and to count the number of the specific frames received by the relay device from each of the communication terminals within the monitoring cycle, and a determination unit to determine, for each of the communication ports, whether a loop path is detected by comparing a counter value, which indicates the number of the specific frames received by the relay device and which is notified from the monitoring unit, with the reception threshold, and to execute control to stop transmission and reception of the frame at the communication port at which a loop path is detected.

Advantageous Effects of Invention

The relay device according to the present invention has an effect where it is possible to easily detect a loop path with a simple configuration, and autonomously eliminate the loop path in a network connected with a plurality of masters.

BRIEF DESCRIPTION OF DRAWINGS

FIG. 13 is a flowchart illustrating an operation in a layer-2 switch according to the fourth embodiment to detect a loop path and notify the network management device of the detection of a loop path.

DESCRIPTION OF EMBODIMENTS

A relay device and a communication network according to embodiments of the present invention will be described in detail below with reference to the accompanying drawings. The present invention is not limited to the embodiments.

First Embodiment

Figure 1:
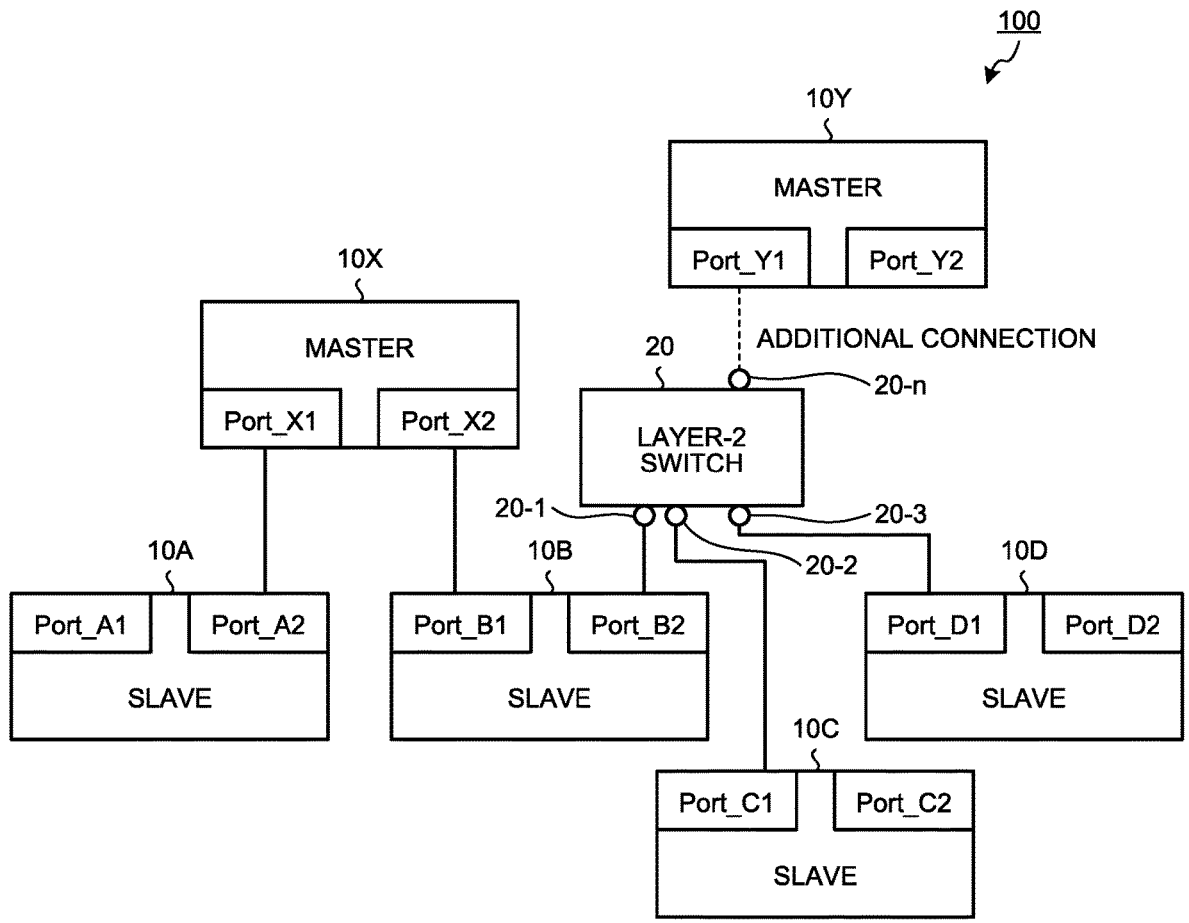
FIG. 1 is a diagram illustrating an example of a CC-Link IE network that serves as a communication network according to a first embodiment.

FIG. 1 is a diagram illustrating an example of a CC-Link IE network that serves as a communication network 100 according to a first embodiment of the present invention. The CC-Link IE network is configured from a network that is a single segment in which a plurality of communication terminals are connected via the Ethernet in a line topology or a star topology.

The communication network 100 includes communication terminals 10X and 10Y that operate as a master, a plurality of communication terminals 10A, 10B, 10C, and 10D that operate as a slave, and a layer-2 switch 20 that is a relay device. Hereinafter, when the communication terminals 10X, 10Y, and 10A to 10D are not distinguished from each other, each of these communication terminals is sometimes referred to as "communication terminal 10". The communication terminal 10 includes two communication ports. The communication port of the communication terminal 10 is connected to the communication port of another communication terminal 10 or a communication port of the layer-2 switch 20 through a Local Area Network (LAN) cable. The communication terminal 10 is either connected to an FA device or incorporated in the FA device. The communication terminal 10 transmits and receives control information or data of the FA device to and from the other communication terminals 10. The communication network 100 is a communication network that connects the FA devices.

In the communication network 100, a first communication port Port_X1 of the communication terminal 10X, and a second communication port Port_A2 of the communication terminal 10A are connected to each other. Also, a second communication port Port_X2 of the communication terminal 10X, and a first communication port Port_B1 of the communication terminal 10B are connected to each other. A second communication port Port_B2 of the communication terminal 10B is connected to a communication port 20-1 of the layer-2 switch 20. A first communication port Port_C1 of the communication terminal 10C is connected to a communication port 20-2 of the layer-2 switch 20. A first communication port Port_D1 of the communication terminal 10D is connected to a communication port 20-3 of the layer-2 switch 20. It is supposed that a first communication port Port_Y1 of the communication terminal 10Y is to be additionally connected to a communication port 20-n of the layer-2 switch 20.

In the communication network 100 according to the present embodiment, the relay device such as the layer-2 switch 20 is provided with a mechanism to monitor the flow rate of a network-existence-confirmation frame (hereinafter, "TestData frame") that is a control frame regularly transmitted from the communication terminals 10X and 10Y that serve as a master of the CC-Link IE, and to determine that a loop path has been formed when the number of received TestData frames within the monitoring cycle exceeds a reception threshold. The TestData frame is a control frame that is transmitted regularly from the master communication terminals 10X and 10Y in order to detect an additional terminal, which has not yet been registered in a token passing circuit, that is, in order to check the state of the communication network 100.

Figure 2:
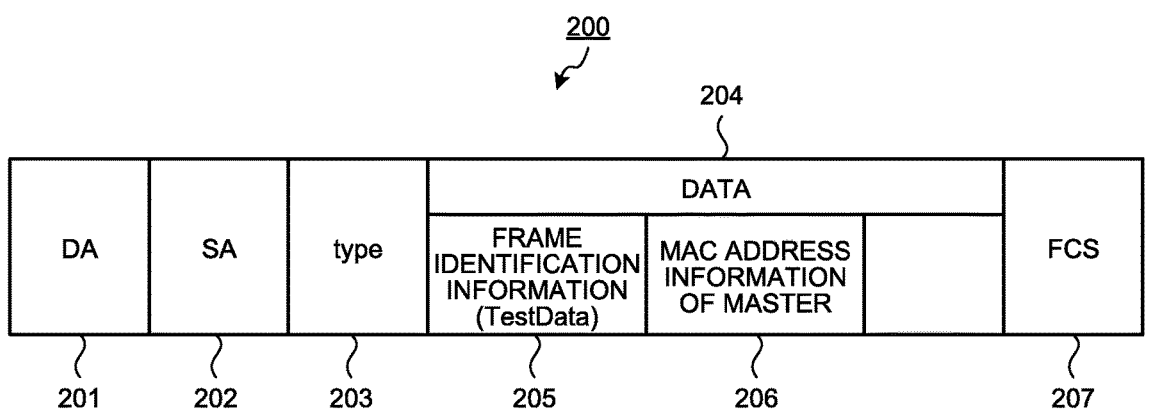
FIG. 2 is a diagram illustrating a configuration example of a TestData frame transmitted from master communication terminals according to the first embodiment.

FIG. 2 is a diagram illustrating a configuration example of a TestData frame 200 transmitted from the master communication terminals 10X and 10Y according to the first embodiment. The TestData frame 200 illustrated in FIG. 2 has a format on the basis of the Institute of Electrical and Electronics Engineers (IEEE) 802.3 Ethernet standards. The TestData frame 200 includes a Destination Address (DA) 201 that is a destination MAC address of a frame, a Source Address (SA) 202 that is a source MAC address of the frame, a type 203 that indicates the Ethernet type, data 204 with a variable length depending on the size of data to be transmitted, and a Frame Check Sequence (FCS) 207 that is used for detecting an error. The data 204 includes frame identification information 205 that is identification information to identify the frame type, and MAC address information 206 of a master having transmitted a TestData frame. In the present embodiment, frame identification information which indicates TestData is stored in the frame identification information 205 in the TestData frame 200. The MAC address of the master communication terminal 10X or the master communication terminal 10Y is stored in the MAC address information 206 of the master. The layer-2 switch 20 checks the frame identification information 205 and the MAC address information 206 of the master, which are part of the data included in the data 204 of the TestData frame 200, and thereby can identify the TestData frame and the master that is the source of the TestData frame.

Figure 3:
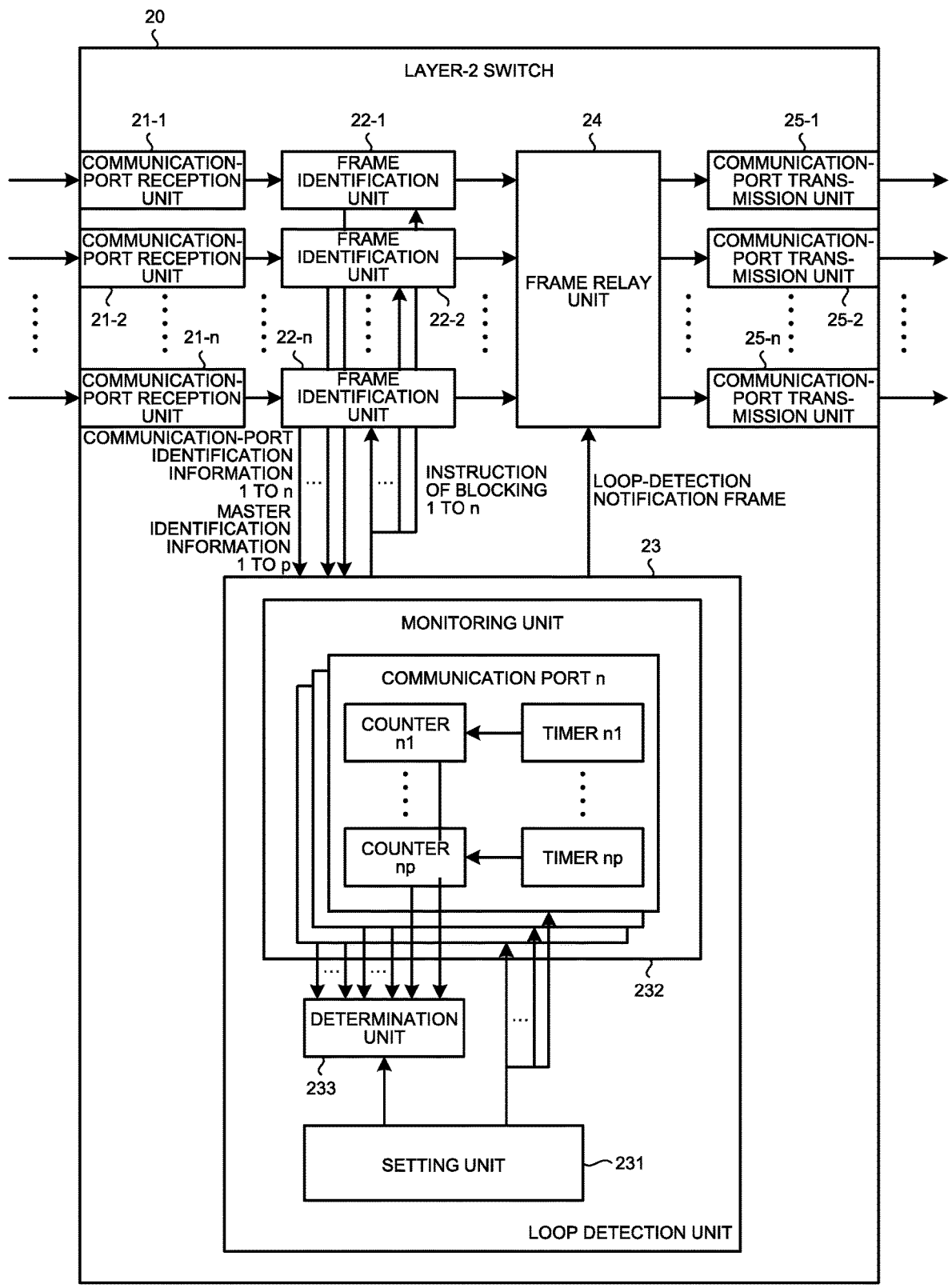
FIG. 3 is a block diagram illustrating a configuration example of a layer-2 switch according to the first embodiment.

FIG. 3 is a block diagram illustrating a configuration example of the layer-2 switch 20 according to the first embodiment. The layer-2 switch 20 includes communication-port reception units 21-1 to 21-n, frame identification units 22-1 to 22-n, a loop detection unit 23, a frame relay unit 24, and communication-port transmission units 25-1 to 25-n. In the following descriptions, when individual configurations of the identical units do not need to be distinguished from each other, each of the communication-port reception units 21-1 to 21-n is sometimes referred to as "communication-port reception unit 21", each of the frame identification units 22-1 to 22-n is sometimes referred to as "frame identification unit 22", and each of the communication-port transmission units 25-1 to 25-n is sometimes referred to as "communication-port transmission unit 25". A loop detection notification frame illustrated in FIG. 3 is described in a fourth embodiment described later.

In FIG. 3, it is assumed that the communication-port reception unit 21-1 and the communication-port transmission unit 25-1 constitute the communication port 20-1 illustrated in FIG. 1. Similarly, the communication-port reception unit 21-2 and the communication-port transmission unit 25-2 constitute the communication port 20-2. The communication-port reception unit 21-n and the communication-port transmission unit 25-n constitute the communication port 20-n. The last number "n" of the communication-port reception units 21-1 to 21-n and the communication-port transmission units 25-1 to 25-n corresponds to the last number "n" of the communication ports 20-1 to 20-n. The layer-2 switch 20 includes a plurality of communication ports 20-1 to 20-n that transmit and receive a frame to and from the communication terminal 10.

The communication-port reception units 21-1 to 21-n receive a frame transmitted from the communication terminal 10.

Each of the frame identification units 22-1 to 22-n identifies the type of the frame received by corresponding one of the communication-port reception units 21-1 to 21-n, and then identifies whether the received frame is a specific frame. In the present embodiment, the specific frame is a TestData frame. Specifically, each of the frame identification units 22-1 to 22-n determines whether the received frame is a TestData frame that is transmitted regularly from the master communication terminal 10. Each of the frame identification units 22-1 to 22-n extracts frame identification information from the received frame, and checks the frame identification information. When the type of the frame is determined to be a TestData frame, the frame identification unit 22 notifies the loop detection unit 23 of information that identifies a communication port having received the TestData frame, and master identifying information that is the MAC address information 206 of the master extracted from the TestData frame. The information that identifies a communication port is information that identifies any one of the communication ports 20-1 to 20-n.

The loop detection unit 23 manages the number of TestData frames received in the communication-port reception units 21-1 to 21-n of the respective communication ports 20-1 to 20-n for each source master, and determines whether a loop path has been formed. The loop detection unit 23 includes a setting unit 231, a monitoring unit 232, and a determination unit 233.

In the layer-2 switch 20, the setting unit 231 receives settings of the monitoring cycle and the reception threshold from a network administrator of the communication network 100 or other personnel. The monitoring cycle is used to monitor the number of received TestData frames that are a specific frame. The reception threshold is set for the number of received specific frames. The reception threshold is a threshold to determine whether a loop path has been formed, that is, to detect the loop path. After having received the monitoring cycle and the reception threshold from the network administrator of the communication network 100 or other personnel, the setting unit 231 sets the received monitoring cycle to the monitoring unit 232, while setting the received reception threshold to the determination unit 233.

The monitoring unit 232 monitors the frequency of reception of a TestData frame, that is, the number of received TestData frames within the set monitoring cycle for each communication port and for each source master. As illustrated in FIG. 3, the monitoring unit 232 includes a plurality of timers and a plurality of counters, for each of the communication ports. Each of the timers measures the monitoring cycle for each master. Each of the counters counts the number of TestData frames received from each master. In a case where a communication port receives a TestData frame from the same master multiple times within the monitoring cycle, the monitoring unit 232 adds "1" to the counter value indicating the number of received TestData frames each time a TestData frame is received. When the monitoring cycle is expired, the monitoring unit 232 stops operation of the corresponding timer, and resets the value of the corresponding counter, that is, returns the value to "0". The monitoring unit 232 notifies the determination unit 233 of each counter value. It is allowable that the monitoring unit 232 notifies the determination unit 233 of the counter value at the same timing between the counters, or at different timings between the counters at which the counter value of each of the counters is changed. The notification timing is not particularly limited.

The determination unit 233 compares the counter value of each counter corresponding to each master in each communication port, which is notified from the monitoring unit 232, with the reception threshold having been set by the setting unit 231. When there is a counter value equal to or greater than the reception threshold, the determination unit 233 determines that a loop path has been formed at a communication port corresponding to the counter whose notified counter value is equal to or greater than the reception threshold. That is, the determination unit 233 determines that the loop path is detected. The determination unit 233 determines whether a loop path is detected for each communication port. When the loop path is detected, the determination unit 233 instructs the frame identification units 22-1 to 22-n for all the communication ports 20-1 to 20-n to block the communication port at which the loop path is detected, that is, to stop transmission and reception of a frame at the communication port at which the loop path is detected.

When the determination unit 233 of the loop detection unit 23 instructs the frame identification units 22-1 to 22-n to block the communication port at which the loop path is detected, the frame identification units 22-1 to 22-n discard a frame input from the corresponding communication port and a frame output to the corresponding communication port, and output a frame for the other communication ports excluding this target communication port to the frame relay unit 24. It is allowable that instead of discarding a frame, the frame identification units 22-1 to 22-n add information indicating that this frame is a target frame to be discarded to the frame, or information on a communication port to which the frame can be transferred, and then outputs this frame to the frame relay unit 24.

The frame relay unit 24 manages a MAC address table that is a table illustrating a correspondence relation between the MAC address and the communication port. The frame relay unit 24 receives frames via the frame identification units 22-1 to 22-n, which have been received respectively by the communication ports 20-1 to 20-n, then refers to the MAC address table, and outputs each of the frames to the communication-port transmission unit 25 of a communication port that corresponds to the destination MAC address of each of the frames. The frame relay unit 24 controls the destination of a frame. In a case where the frame relay unit 24 receives a broadcasted frame such as a TestData frame, when there is no instruction from the determination unit 233 in the loop detection unit 23 to block a communication port, the frame relay unit 24 outputs the received frame to all the communication ports except the communication port having received this frame. When information indicating that a frame is a target frame to be discarded has been added to the frame by any of the frame identification units 22-1 to 22-n, the frame relay unit 24 discards this frame. When information of a communication port to which a frame can be transferred has been added to the frame by any of the frame identification units 22-1 to 22-n, the frame relay unit 24 outputs the frame received via any of the frame identification units 22-1 to 22-n to the communication-port transmission unit 25 corresponding to the communication port to which this frame can be transferred.

The communication-port transmission units 25-1 to 25-n transmit a frame input from the frame relay unit 24 to the communication terminal 10 connected to each of the communication ports.

Figure 4:
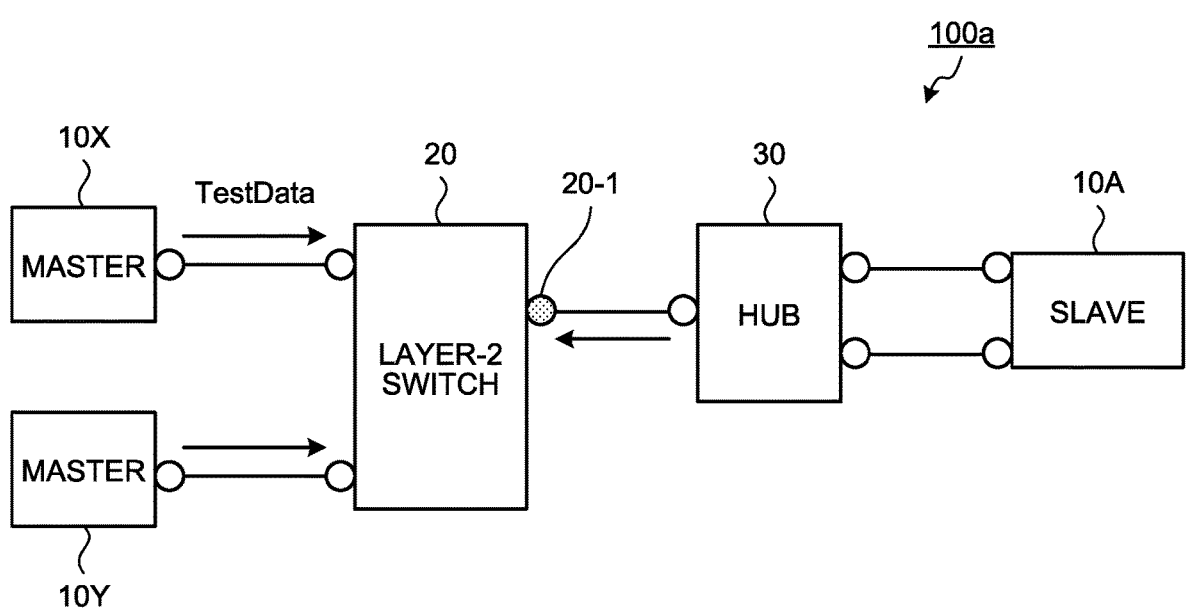
FIG. 4 is a diagram illustrating an example of a communication network when a loop path is formed at an end of the communication network away from the layer-2 switch according to the first embodiment.

Next, the loop-path detecting operation of the layer-2 switch 20 in the communication network is described. The operation in a communication network 100a with a configuration illustrated in FIG. 4 is described below as an example. FIG. 4 is a diagram illustrating an example of the communication network 100a when a loop path is formed at an end of this communication network 100a away from the layer-2 switch 20 according to the first embodiment is connected. In the configuration of the communication network 100a, the master communication terminals 10X and 10Y and the slave communication terminal 10A are connected to each other through the layer-2 switch 20 and a hub 30. The hub 30 is connected to the communication port 20-1 of the layer-2 switch 20, and a loop path is assumed to be formed between the hub 30 and the communication terminal 10A. Upon receiving a frame, the hub 30 transfers the frame to all the communication ports except the communication port having received this frame.

In the communication network 100a, a TestData frame transmitted from the communication terminals 10X and 10Y is repeatedly transferred and replicated on the loop path. As a result, at the communication port 20-1 of the layer-2 switch 20, the number of received TestData frames within the monitoring cycle exceeds the reception threshold. Thus, the loop detection unit 23 detects that the loop path is present. Upon detecting the loop path, the loop detection unit 23 instructs the frame identification units 22-1 to 22-n to block the communication port 20-1 at which the loop path is detected so as not to transmit or receive a frame at the communication port 20-1.

In the layer-2 switch 20, the frame identification units 22-1 to 22-n, which have been instructed to block the communication port 20-1, execute control to stop transmission and reception of a frame at the communication port 20-1. Due to this control, in the communication network 100a, the loop path is disconnected from the CC-Link IE network.

Figure 5:
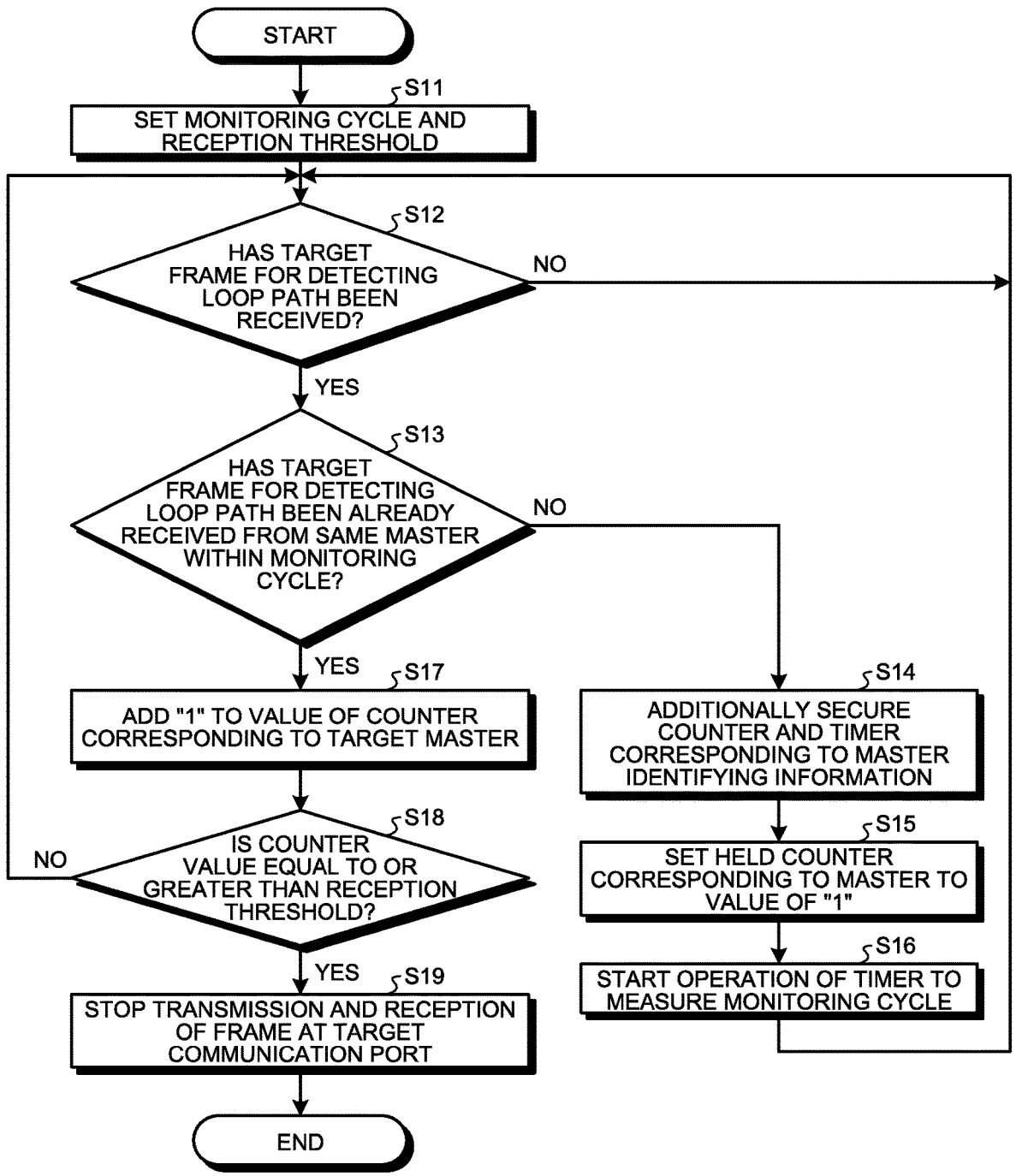
FIG. 5 is a flowchart illustrating a loop-path detecting operation in the layer-2 switch according to the first embodiment.

The loop-path detecting operation in the layer-2 switch 20 is described below with reference to a flowchart. FIG. 5 is a flowchart illustrating the loop-path detecting operation in the layer-2 switch 20 according to the first embodiment.

First, in the layer-2 switch 20, the setting unit 231 of the loop detection unit 23 receives settings of the monitoring cycle and the reception threshold from a network administrator or other personnel, and then sets the monitoring cycle to the monitoring unit 232, while setting the reception threshold to the determination unit 233 (Step S11).

The frame identification units 22-1 to 22-n identify a frame received by the communication-port reception units 21-1 to 21-n, and check whether a target frame for detecting a loop path, that is, a TestData frame has been received (Step S12).

When the target frame for detecting a loop path, that is, the TestData frame has not yet been received (NO at Step S12), the frame identification units 22-1 to 22-n continue to check whether the target frame for detecting a loop path, that is, the TestData frame has been received.

When the target frame for detecting a loop path, that is, the TestData frame has been received (YES at Step S12), the frame identification units 22-1 to 22-n notify the loop detection unit 23 of information that identifies a communication port having received the TestData frame, and master identifying information that is the MAC address information 206 of the master extracted from the TestData frame.

The monitoring unit 232 of the loop detection unit 23 checks for each communication port whether a target frame for detecting a loop path, that is, a TestData frame has been already received from the same master within the monitoring cycle (Step S13).

When the target frame for detecting a loop path, that is, the TestData frame has not yet been received from the same master within the monitoring cycle (NO at Step S13), the monitoring unit 232 additionally secures a counter and a timer corresponding to the master identification information (Step S14). Specifically, the monitoring unit 232 holds a combination of a timer n1 and a counter n1, a combination of a timer np and a counter np, or other combinations which are illustrated in FIG. 3.

The monitoring unit 232 sets the held counter corresponding to the master to the value of "1" (Step S15), and starts operation of the timer to measure the monitoring cycle (Step S16). As described above, when the monitoring cycle is expired, the monitoring unit 232 stops operation of the corresponding timer, and resets the value of the corresponding counter, that is, returns the value to "0".

In the layer-2 switch 20, the process returns to Step S12 and the process described above is repeatedly performed. In the layer-2 switch 20, when the target frame for detecting a loop path, that is, the TestData frame has already been received from the same master within the monitoring cycle (YES at Step S13), the monitoring unit 232 adds "1" to the value of the counter corresponding to the target master (Step S17). The monitoring unit 232 notifies the determination unit 233 of information regarding the counter value which indicates the number of received TestData frames counted by the counter.

The determination unit 233 compares the counter value notified from the monitoring unit 232 with the reception threshold having been set by the setting unit 231 (Step S18).

When the counter value is smaller than the reception threshold (NO at Step S18), in the layer-2 switch 20, the process returns to Step S12 and the process described above is repeatedly performed.

When the counter value is equal to or greater than the reception threshold (YES at Step S18), the determination unit 233 determines that a loop path is detected at a target communication port, and executes control to stop transmission and reception of a frame at the target communication port (Step S19). Specifically, as described above, the determination unit 233 instructs the frame identification units 22-1 to 22-n in all the communication ports 20-1 to 20-n to block the communication port at which a loop path is detected.

In the layer-2 switch 20 illustrated in FIG. 3, the loop detection unit 23 and the frame relay unit 24 are separately configured. However, it is also allowable that the frame relay unit 24 has a function of the loop detection unit 23, that is, the frame relay unit 24 is configured to detect a loop.

Further, in the loop detection unit 23, the determination unit 233 detects a loop path and executes control to stop transmission and reception of a frame at the communication port at which the loop path is detected. However, it is also permissible that loop-path detection is performed by a unit separate from a unit that executes control to stop transmission and reception of a frame at the communication port at which the loop path is detected.

Furthermore, the loop detection unit 23 determines whether a loop path is present on the basis of the result of the comparison between the reception threshold and the counter value which indicates the number of TestData frames received from each of the source communication terminals 10X and 10Y within the monitoring cycle. However, it is also possible for the loop detection unit 23 to determine whether a loop path is present by comparing the number of TestData frames received from the source communication terminal 10X with the number of TestData frames received from the source communication terminal 10Y in each communication port. That is, when there are significant variations in the number of received TestData frames, the loop detection unit 23 can determine that the significant variations are caused by the fact that a loop path is formed at a communication port having received the largest number of frames for a source communication terminal. For example, in a case where the communication ports 20-1 to 20-3 are present, and where the communication port 20-2 has received a greater number of TestData frames than that in the communication ports 20-1 and 20-3, it is allowable that the loop detection unit 23 determines that a loop path is formed at the communication port 20-2, and thus blocks this communication port 20-2.

The loop detection unit 23 determines whether a loop path has been formed by using a TestData frame. However, in a case where there is a similar control frame, for example, a frame that is regularly broadcasted from the master communication terminals 10X and 10Y, it is also allowable that the loop detection unit 23 determines whether a loop path is formed by using this regularly-broadcasted frame.

Each of the communication networks 100 and 110a has been described as the CC-Link IE network. However, as long as a communication network includes a communication terminal that regularly broadcasts a control frame, the layer-2 switch 20 that is the relay device is applicable to this communication network. That is, the loop detection unit 23 of the layer-2 switch 20 that is the relay device is capable of detecting a loop path by monitoring the reception state of a broadcasted control frame, that is, the number of received control frames.

Next, a hardware configuration of the layer-2 switch 20 is described. In the layer-2 switch 20, the communication-port reception units 21-1 to 21-n and the communication-port transmission units 25-1 to 25-n, that is, the communication ports 20-1 to 20-n are implemented by an interface circuit that transmits and receives an Ethernet frame. The frame identification units 22-1 to 22-n, the loop detection unit 23, and the frame relay unit 24 are implemented by a processing circuit. That is, the layer-2 switch 20 includes a processing circuit that identifies the type of a received frame, determines whether a loop path is formed, and controls the destination of the frame. It is allowable that the processing circuit is either dedicated hardware, or a memory and a Central Processing Unit (CPU) that executes a program stored in the memory.

Figure 6:
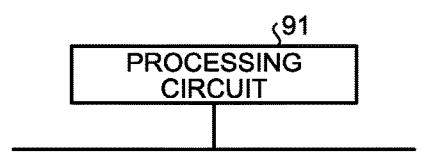
FIG. 6 is a diagram illustrating an example of a processing circuit of the layer-2 switch according to the first embodiment when the processing circuit is configured by dedicated hardware.

FIG. 6 is a diagram illustrating an example of the processing circuit of the layer-2 switch 20 according to the first embodiment when the processing circuit is configured by dedicated hardware. In the case where the processing circuit is dedicated hardware, a processing circuit 91 illustrated in FIG. 6 is, for example, a single circuit, a combined circuit, a programmed processor, a parallel-programmed processor, an Application Specific Integrated Circuit (ASIC), a Field Programmable Gate Array (FPGA), or a combination thereof. It is permissible that each of the functions of the frame identification units 22-1 to 22-n, the loop detection unit 23, and the frame relay unit 24 is implemented by a processing circuit 91 individually, or the functions are implemented together by a single processing circuit 91.

Figure 7:
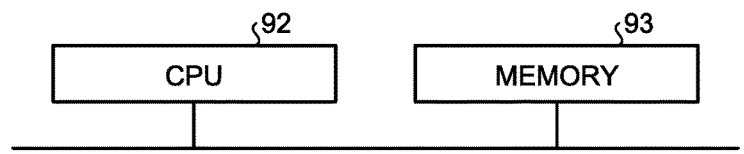
FIG. 7 is a diagram illustrating an example in which the processing circuit of the layer-2 switch according to the first embodiment is configured by a CPU and a memory.

FIG. 7 is a diagram illustrating an example in which the processing circuit of the layer-2 switch 20 according to the first embodiment is configured by a CPU and a memory. In a case where the processing circuit is configured by a CPU 92 and a memory 93, the functions of the frame identification units 22-1 to 22-n, the loop detection unit 23, and the frame relay unit 24 are implemented by software, firmware, or a combination of the software and the firmware. The software or the firmware is described as a program and stored in the memory 93. In the processing circuit, the CPU 92 reads and executes the program stored in the memory 93, thereby implementing the function of each unit. That is, the layer-2 switch 20 includes the memory 93 that stores therein programs for causing the processing circuit to consequently execute a step of identifying the type of a received frame, a step of determining whether a loop path is formed, and a step of controlling the destination of the frame. These programs are also regarded as causing a computer to execute the procedures and methods of the frame identification units 22-1 to 22-n, the loop detection unit 23, and the frame relay unit 24. The CPU 92 can be a processing unit, an arithmetic unit, a microprocessor, a microcomputer, a processor, a Digital Signal Processor (DSP), or the like. The memory 93 corresponds to, for example, a non-volatile or volatile semiconductor memory such as a Random Access Memory (RAM), a Read Only Memory (ROM), a flash memory, an Erasable Programmable ROM (EPROM), and an Electrically EPROM (EEPROM), a magnetic disk, a flexible disk, an optical disk, a compact disk, a minidisk, or a Digital Versatile Disk (DVD).

It is also allowable that the functions of the frame identification units 22-1 to 22-n, the loop detection unit 23, and the frame relay unit 24 are partially implemented by dedicated hardware, while being partially implemented by software or firmware. For example, it is possible to implement the function of the frame identification units 22-1 to 22-n by the processing circuit 91 that serves as dedicated hardware, and to implement the functions of the loop detection unit 23 and the frame relay unit 24 by reading and executing the programs stored in the memory 93 by the CPU 92.

In this manner, the processing circuit can implement each of the functions described above by dedicated hardware, software, firmware, or a combination thereof.

As described above, according to the present embodiment, the layer-2 switch 20 determines whether a loop path is present on the basis of the result of the comparison between the reception threshold and the number of received control frames within the monitoring cycle, where the control frames are regularly broadcasted from the master communication terminals 10X and 10Y in the communication network 100 or 100a. When a loop path is detected, the layer-2 switch 20 blocks the communication port at which the loop path is detected. Due to this operation, the layer-2 switch 20 can easily detect a loop path in the CC-Link IE network, and can also eliminate the loop path autonomously.

Second Embodiment

In the first embodiment, the operation of the layer-2 switch 20 to detect and eliminate a loop path has been described. In a second embodiment, the operation of a layer-2 switch that does not perform an erroneous detection of a loop path when an additional master is connected to a network is described.

Figure 8:
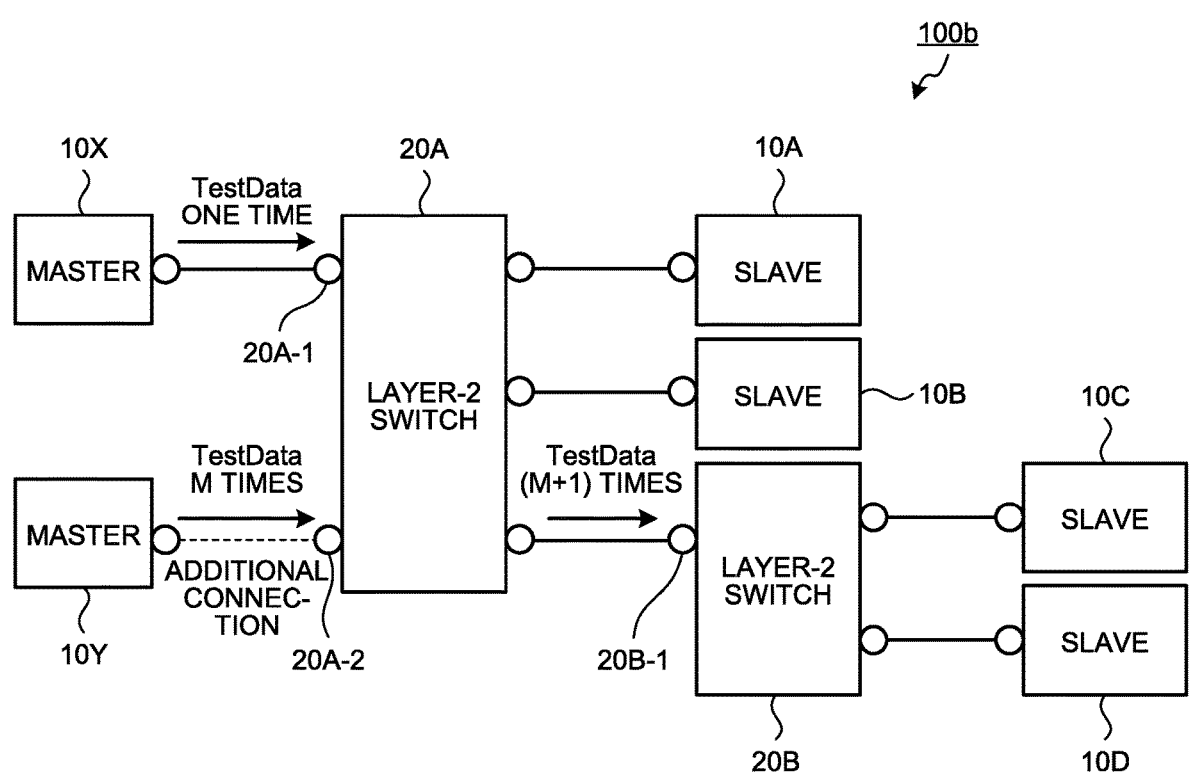
FIG. 8 is a diagram illustrating an example of a communication network in a case where a single master has been already connected to a layer-2 switch according to a second embodiment, and a second master is additionally connected to the layer-2 switch.

The operation in a communication network 100b configured as illustrated in FIG. 8 is described below as an example. FIG. 8 is a diagram illustrating an example of the communication network 100b in a case where a single master has been already connected to a layer-2 switch 20A according to the second embodiment, and a second master is additionally connected to the layer-2 switch 20A. In the configuration of the communication network 100b, the master communication terminal 10X and the slave communication terminals 10A and 10B are connected to each other through the layer-2 switch 20A. The communication terminals 10C and 10D are connected to the layer-2 switch 20A through a layer-2 switch 20B. The configuration of the layer-2 switches 20A and 20B is identical to that of the layer-2 switch 20 according to the first embodiment (see FIG. 3).

In the communication network 100b, because a loop path is not present, a TestData frame transmitted from the master communication terminal 10X is properly transferred to the communication terminals 10A and 10B through the layer-2 switch 20A, and is also properly transferred to the communication terminals 10C and 10D through the layer-2 switches 20A and 20B. In the layer-2 switches 20A and 20B, the number of received TestData frames within a monitoring cycle that is shorter than the control cycle of the communication network 100b does not exceed the reception threshold.

In a case where the communication terminal 10Y having the master function is additionally connected to the layer-2 switch 20A, the communication terminal 10Y transmits a TestData frame M times consecutively in order to notify the communication network 100b of an additional master having been connected to the layer-2 switch 20A. In this case, in the layer-2 switch 20A, a communication port 20A-1 receives a TestData frame once within the monitoring cycle, while a communication port 20A-2 receives a TestData frame M times within the monitoring cycle. Further, in the layer-2 switch 20B, a communication port 20B-1 receives a TestData frame once from the communication terminal 10X, while receiving a TestData frame M times from the communication terminal 10Y within the monitoring cycle. Thus, the reception threshold is set to (M+1) in the setting unit 231 by a network administrator or other personnel, and accordingly the layer-2 switch 20B can properly detect a loop path.

It is assumed that the layer-2 switch 20B does not have the configuration illustrated in FIG. 3, but is configured to detect a loop path only on the basis of the number of received TestData frames without identifying the source master. Assuming that the reception threshold is set to (M+1), when the communication port 20B-1 receives a TestData frame (M+1) times, the layer-2 switch 20B therefore determines that a loop path is detected, and blocks the communication port 20B-1. Thus, the communication terminals 10C and 10D are disconnected from the network, and accordingly cannot communicate with the communication terminals 10X, 10A, and 10B. In order to avoid such a situation as described above, in the layer-2 switch 20B, the reception threshold needs to be set equal to or greater than (M+2). This results in a delay in detecting a loop path. Furthermore, there is also a case where the layer-2 switch 20B does not identify the source master as the above, and a plurality of master communication terminals, for example, N master communication terminals are additionally connected to the network simultaneously. In that case, in order not to perform an erroneous detection of a loop path, the reception threshold needs to be set equal to or greater than (M×N+2). This case results in a further delay in detecting a loop path in the layer-2 switch 20B.

In contrast, in the layer-2 switch 20B configured in the same manner as the configuration illustrated in FIG. 3, the reception threshold of a TestData frame is set to (M+1) for each source master. The layer-2 switch 20B can thereby detect a loop path quickly and accurately without a delay in detecting the loop path.

In the descriptions of the present embodiment, the communication network 100b is assumed to be the CC-Link IE network. However, the layer-2 switch 20 is also applicable to a communication network other than the CC-Link IE network as long as the communication network is formed by including a communication terminal that regularly broadcasts a control frame.

As described above, according to the present embodiment, in the communication network 100b connected with a plurality of masters, when the communication terminal 10 having the master function is additionally connected to the communication network 100b, the layer-2 switch 20B sets the reception threshold to (M+1) obtained by adding "1" to "M". "M" is the number of times of consecutively transmitting a TestData frame from this additional communication terminal 10. Due to this setting, even in a case where two or more communication terminals 10 having the master function are connected to the communication network 100b, the layer-2 switch 20B can still detect a loop path quickly and accurately.

Third Embodiment

In the first embodiment, the operation of the layer-2 switch 20 in the case where a single communication port satisfies the loop-path detection condition, that is, "counter value≥reception threshold" has been described. In a third embodiment, the operation of the layer-2 switch 20 in a case where a plurality of communication ports satisfy the loop-path detection condition is described.

Figure 9:
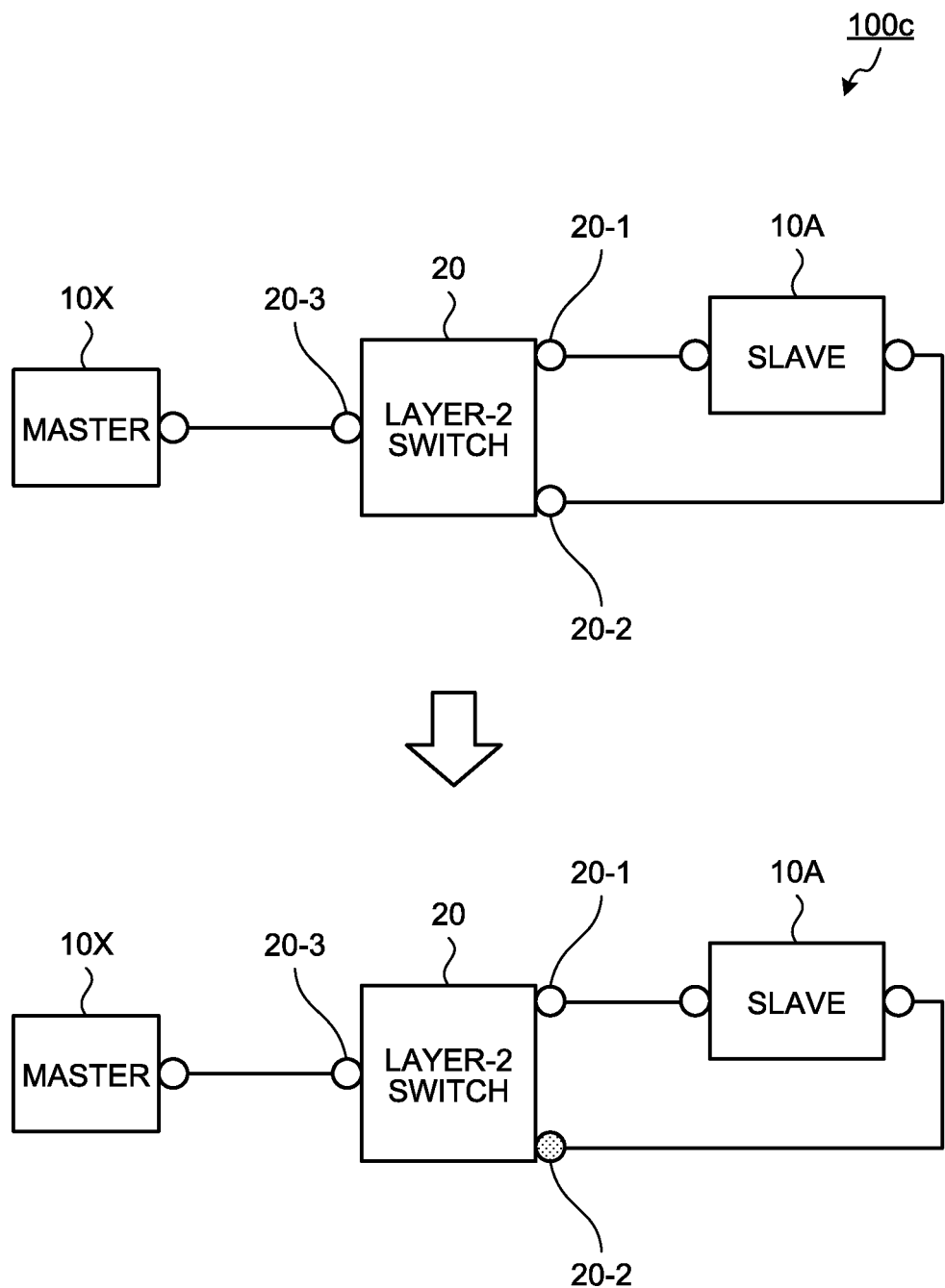
FIG. 9 is a diagram illustrating an example of a communication network when a loop path has been formed between communication ports of a layer-2 switch according to a third embodiment.
Figure 10:
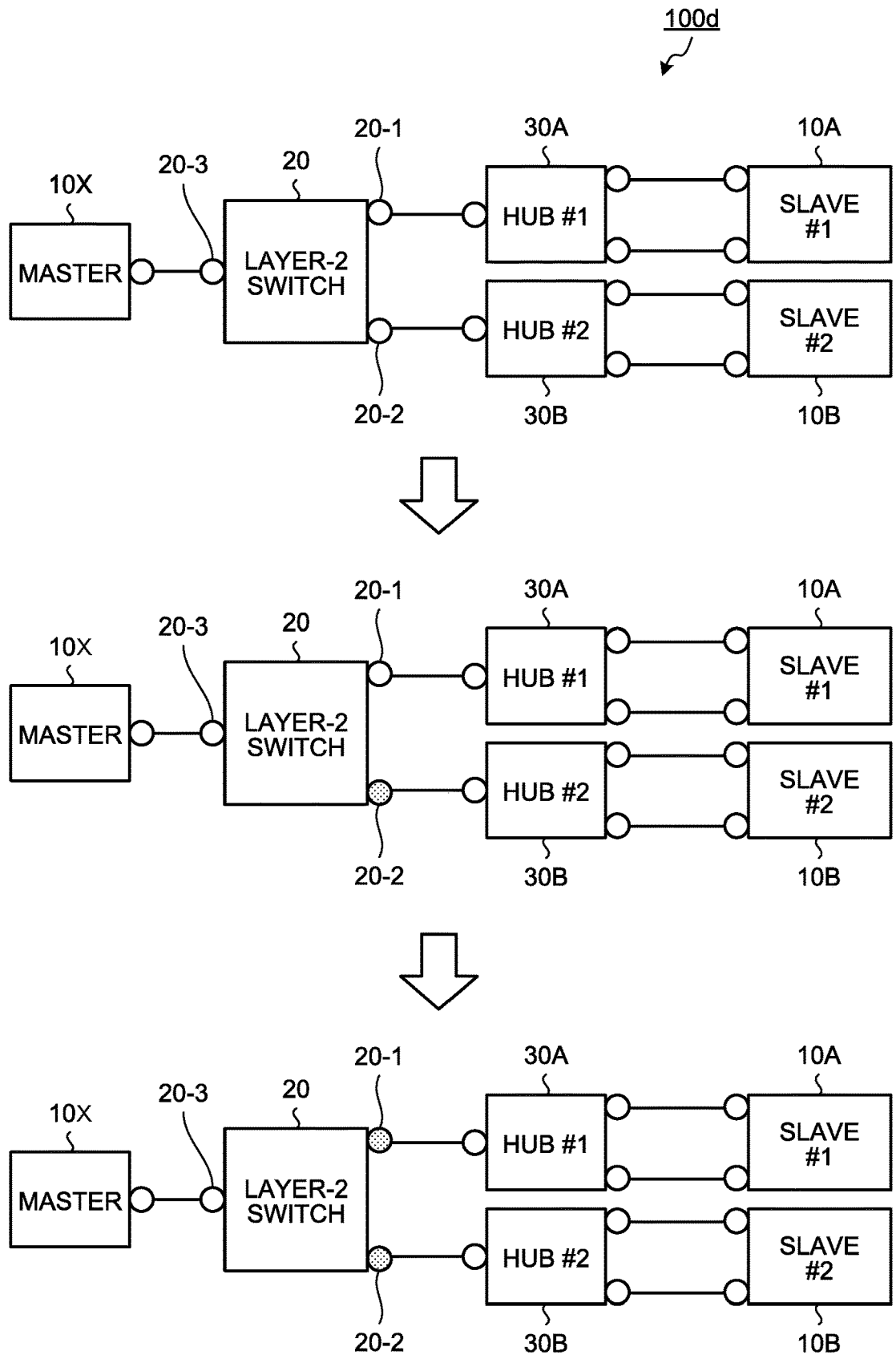
FIG. 10 is a diagram illustrating an example of a communication network when there are a plurality of loop paths at ends of the communication network away from the layer-2 switch according to the third embodiment.

There are several possible configurations of a communication network in which there are a plurality of communication ports which satisfy the loop-path detection condition. For example, there is a possible case where a loop path is formed between communication ports of the layer-2 switch 20, or where there are a plurality of loop paths at ends of the communication network away from the layer-2 switch 20. FIG. 9 is a diagram illustrating an example of a communication network 100c when a loop path is formed between the communication ports of the layer-2 switch 20 according to the third embodiment. FIG. 10 is a diagram illustrating an example of a communication network 100d when there are a plurality of loop paths ends of the communication network away from the layer-2 switch 20 according to the third embodiment. The configuration of the layer-2 switch 20 is identical to that of the layer-2 switch 20 according to the first embodiment (see FIG. 3).

The communication network 100c illustrated in FIG. 9 has a configuration in which the master communication terminal 10X is connected to the communication port 20-3 of the layer-2 switch 20, while the slave communication terminal 10A is connected to the communication ports 20-1 and 20-2. In the communication network 100c, a loop path is formed between the communication terminal 10A and the communication ports 20-1 and 20-2 of the layer-2 switch 20.

Meanwhile, in the communication network 100d illustrated in FIG. 10, the master communication terminal 10X is connected to the communication port 20-3 of the layer-2 switch 20, and a hub 30A is connected to the communication port 20-1, while a hub 30B is connected to the communication port 20-2. The slave communication terminal 10A is connected to the hub 30A, while the slave communication terminal 10B is connected to the hub 30B. In the communication network 100d, a loop path is formed between the hub 30A and the communication terminal 10A, and also a loop path is formed between the hub 30B and the communication terminal 10B.

When a plurality of communication ports satisfy the loop-path detection condition, the layer-2 switch 20 cannot determine which form in the configurations illustrated in FIG. 9 and FIG. 10 the loop path has.

Thus, in the present embodiment, when a plurality of communication ports satisfy the loop-path detection condition, the layer-2 switch 20 selects any one of the communication ports which satisfy the loop-path detection condition to block all the communication ports except the selected communication port. That is, upon detecting aloop path at a plurality of communication ports, the layer-2 switch 20 stops transmission and reception of frames at all the communication ports except the one communication port.

In the communication network 100c illustrated in FIG. 9, after a while since the operation start, the loop detection unit 23 of the layer-2 switch 20 detects that the communication ports 20-1 and 20-2 satisfy the loop-path detection condition, and then blocks either one of the communication ports 20-1 and 20-2. For example, the layer-2 switch 20 blocks the communication port 20-2. Consequently, regarding the layer-2 switch 20, a loop path between the communication ports 20-1 and 20-2 is eliminated. With this elimination, at the unblocked communication port 20-1, the number of received TestData frames within the monitoring cycle becomes a normal value equal to or smaller than the reception threshold. As a result, the loop detection unit 23 does not detect a loop path again at the communication port 20-1. In the communication network 100c, the layer-2 switch 20 can eliminate the loop path by only blocking a single point along the loop path, and thus can maintain the connection between the master communication terminal 10X and the slave communication terminal 10A.

On the other hand, in the communication network 100d illustrated in FIG. 10, there are a plurality of loop paths at ends of the communication network 100d away from the layer-2 switch 20. For example, the loop detection unit 23 of the layer-2 switch 20 blocks the communication port 20-2 in accordance with the same procedure as the communication network 100c illustrated in FIG. 9. However, the loop path at an end away from the communication port 20-1 down the communication network 100d has not yet been eliminated. Thus, in the layer-2 switch 20, the number of TestData frames received by the communication port 20-1 within the monitoring cycle continues to exceed the reception threshold. Accordingly, when the number of TestData frames received by the communication port 20-1 within the monitoring cycle still continues to exceed the reception threshold, the loop detection unit 23 further blocks the communication port 20-1 after a predetermined time elapses. As a result, the loop paths are eliminated in the communication network 100d.

Figure 11:
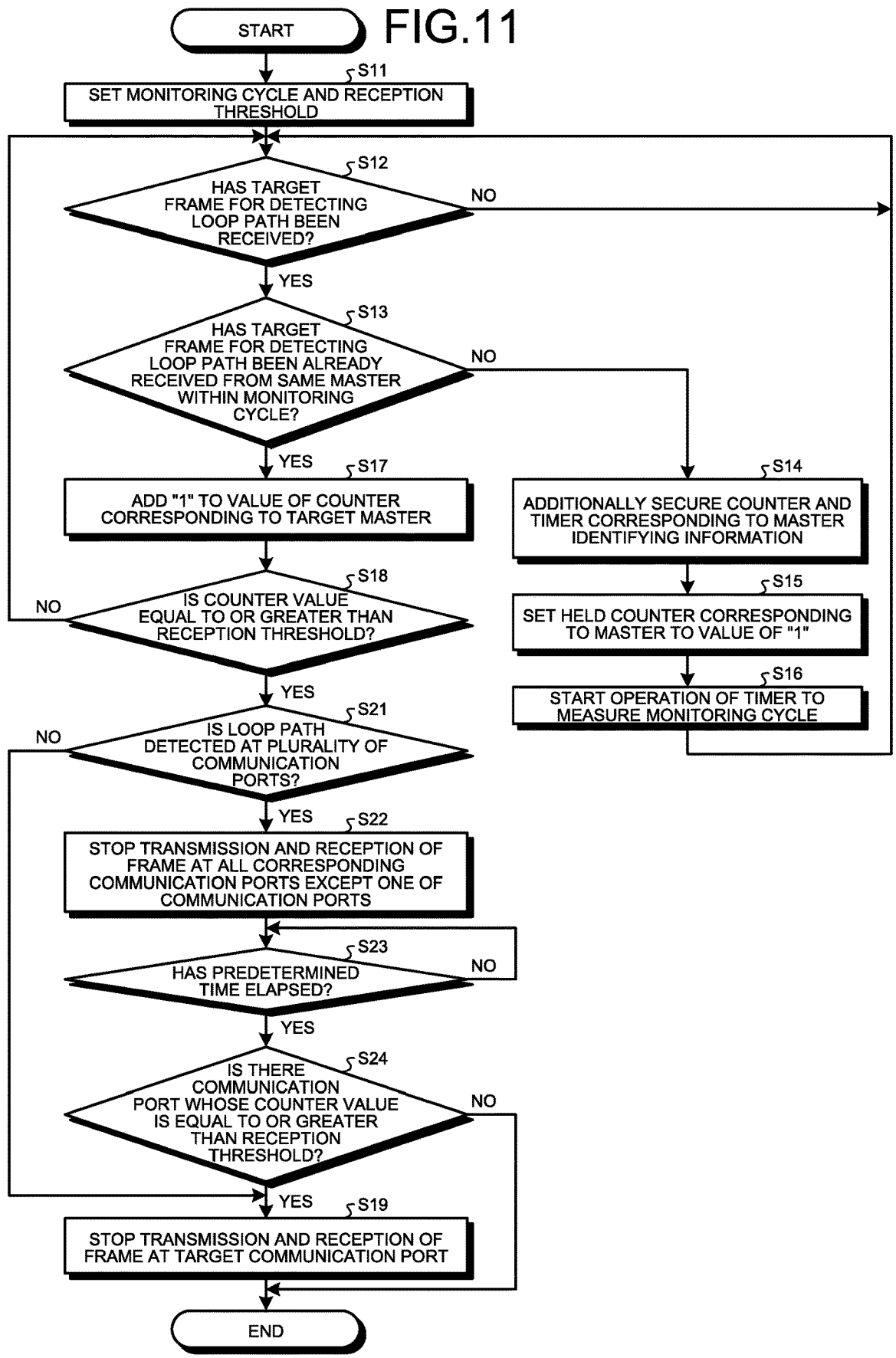
FIG. 11 is a flowchart illustrating an operation in the layer-2 switch according to the third embodiment when it detects a loop path at communication ports.

The operation of the layer-2 switch 20 of when the layer-2 switch 20 detects a loop path at a plurality of communication ports is described below with reference to a flowchart. FIG. 11 is a flowchart illustrating the operation of the layer-2 switch 20 according to the third embodiment when the layer-2 switch 20 detects a loop path at the plurality of the communication ports. The processes at Step S11 to Step S18 are the same as those of the processes illustrated in FIG. 5.

When there are a plurality of communication ports which indicate a counter value equal to or greater than the reception threshold, that is, a loop path is detected at plurality of communication ports (YES at Step S21), the determination unit 233 of the layer-2 switch 20 stops transmission and reception of frames at all the corresponding communication ports except one of these communication ports (Step S22).

The determination unit 233 stands by until a predetermined time elapses (NO at Step S23). When a predetermined time has elapsed (YES at Step S23), the determination unit 233 checks again whether there is a communication port whose counter value is equal to or greater than the reception threshold (Step S24).

When there is a communication port whose counter value is equal to or greater than the reception threshold (YES at Step S24), the determination unit 233 determines that a loop path is continuously present at the corresponding communication port, that is, one communication port at which the determination unit 233 has not stopped transmission or reception of a frame, among a plurality of ports at which the loop path has been detected. The determination unit 233 then executes control to stop transmission and reception of frames at this target communication port, that is, the one communication port at which the determination unit 233 has not stopped transmission or reception of frames (Step S19).

In contrast, when there is no communication port whose counter value is equal to or greater than the reception threshold (NO at Step S24), the determination unit 233 determines that the loop path has been eliminated in the communication network and ends the processing.

When this is not a case where a loop path is detected at a plurality of communication ports (NO at Step S21), that is, this is the same case as in the first embodiment, the determination unit 233 performs a process at Step S19.

As described above, according to the present embodiment, when a loop path is detected at a plurality of communication ports, first the loop detection unit 23 of the layer-2 switch 20 selects any one of the communication ports at which the loop path is detected to block all the communication ports except the selected communication port. When the state in which a loop path is detected is still continued, the loop detection unit 23 further blocks this selected communication port. Due to this operation, the layer-2 switch 20 can eliminate the loop path autonomously, while avoiding blocking a larger number of communication ports than necessary.

It is allowable that when the loop detection unit 23 detects a loop path at a plurality of communication ports, the loop detection unit 23 does not simultaneously block all the communication ports except one selected communication port, but blocks the communication ports one by one in turn. That is, the loop detection unit 23 first blocks one of the communication ports at which a loop path is detected, and then monitors the state of the remaining communication ports, that is, the unblocked communication ports at which the loop path is detected, for a predetermined period. When the loop path is not eliminated, the loop detection unit 23 blocks another one of the communication ports at which the loop path is detected, and then monitors whether the loop path has been eliminated at the remaining communication ports for a predetermined period. It is also allowable that the loop detection unit 23 repeats the operation to block the communication ports one by one by the time when the loop path is eliminated. Due to this operation, by blocking the communication ports at which a loop path is detected one by one in turn, the layer-2 switch 20 can avoid the situation where a larger number of communication ports than necessary are blocked.

Fourth Embodiment

In the first and third embodiments, the procedure for detecting a loop path and autonomously eliminating the loop path by the layer-2 switch 20 is described. In the fourth embodiment, a case is described in which when the layer-2 switch 20 detects a loop path, the layer-2 switch 20 eliminates the loop path and notifies a network management device of the detection of the loop path.

Figure 12:
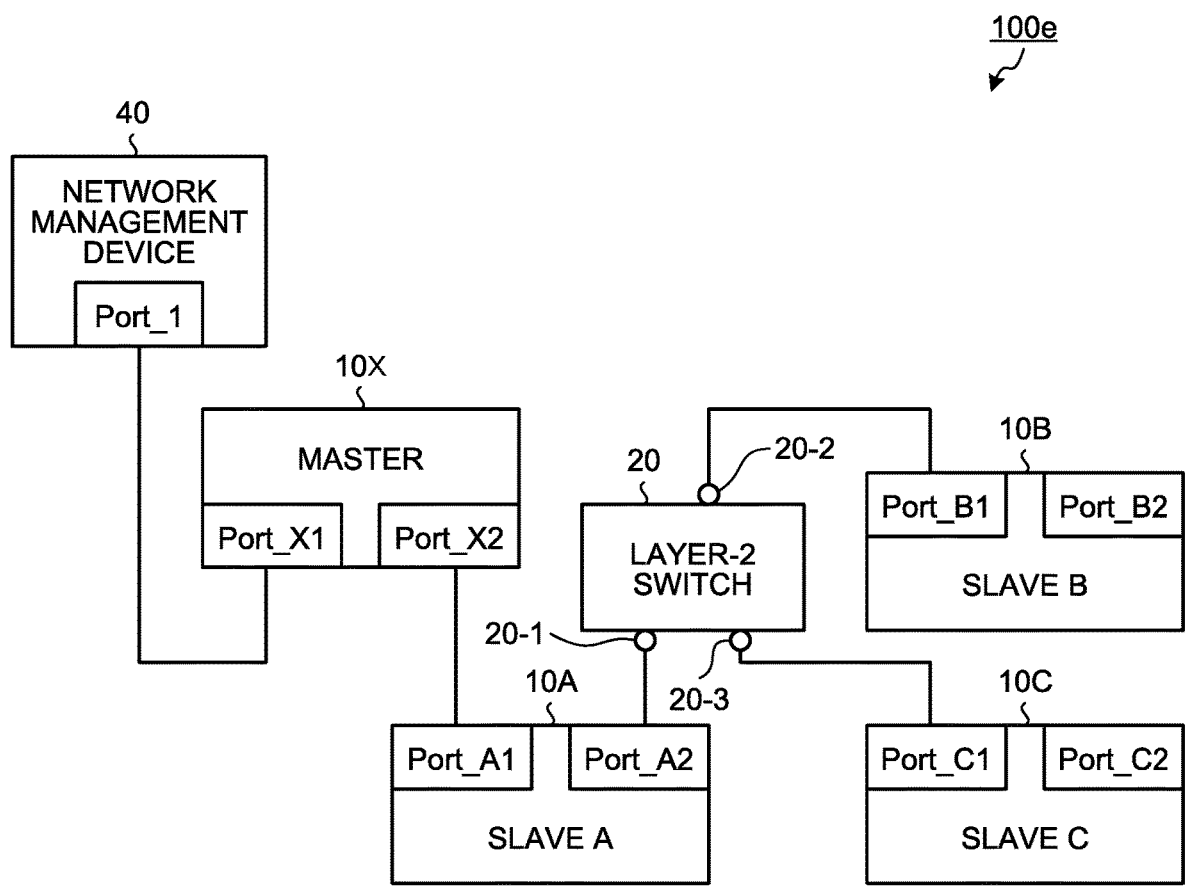
FIG. 12 is a diagram illustrating a configuration example of a communication network including a network management device that manages alarm information on a CC-Link IE network according to a fourth embodiment.

FIG. 12 is a diagram illustrating a configuration example of a communication network 100e including a network management device 40 that manages alarm information on a CC-Link IE network according to the fourth embodiment. The communication network 100e is configured by including the communication terminal 10X that operates as a master, a plurality of the communication terminals 10A to 10C that operate as a slave, the layer-2 switch 20 that is a relay device, and the network management device 40.

In the communication network 100e, the first communication port Port_X1 of the communication terminal 10X and a communication port Port_1 of the network management device 40 are connected to each other, while the second communication port Port_X2 of the communication terminal 10X and the first communication port Port_A1 of the communication terminal 10A are connected to each other. The second communication port Port_A2 of the communication terminal 10A is connected to the communication port 20-1 of the layer-2 switch 20. The first communication port Port_B1 of the communication terminal 10B is connected to the communication port 20-2 of the layer-2 switch 20. The first communication port Port_C1 of the communication terminal 10C is connected to the communication port 20-3 of the layer-2 switch 20. The configuration of the layer-2 switch 20 is identical to that of the layer-2 switch 20 according to the first embodiment (see FIG. 3).

In the layer-2 switch 20, when the determination unit 233 of the loop detection unit 23 detects a loop path, the determination unit 233 blocks a target communication port at which the loop path is detected in accordance with the same procedure as in the first and third embodiments. In the present embodiment, the determination unit 233 further generates a loop-detection notification frame which indicates a communication port at which a loop path is detected, and transmits the generated loop-detection notification frame to the network management device 40 through the frame relay unit 24 and the communication-port transmission unit 25.

When the network management device 40 receives the loop-detection notification frame, the device 40 displays information indicating that the loop path is detected on a display unit (not illustrated) to notify the network administrator.

The operation of the layer-2 switch 20 for notifying the network management device 40 of the detection of the loop path is described below with reference to a flowchart. FIG. 13 is a flowchart illustrating the operation in the layer-2 switch 20 according to the fourth embodiment to detect a loop path and notify the network management device 40 of the detection of the loop path. The processes at Step S11 to Step S19 are the same as the processes illustrated in FIG. 5.

In the layer-2 switch 20, upon executing control to block a communication port at Step S19, the determination unit 233 of the loop detection unit 23 generates a loop-detection notification frame, and transmits the generated loop-detection notification frame to the network management device 40 through the frame relay unit 24 and the communication-port transmission unit 25 (Step S31).

As described above, according to the present embodiment, in the layer-2 switch 20, when the determination unit 233 of the loop detection unit 23 detects a loop path, the determination unit 233 eliminates the loop path autonomously, and notifies the network management device 40 of information regarding a communication port at which the loop path is detected. Due to this operation, the layer-2 switch 20 can immediately notify the network management device 40 of the information regarding the communication port at which the loop path is detected. In addition, by checking the network management device 40, the network administrator can recognize the communication port at which the loop path is detected.

In the first, third, and fourth embodiments, the case has been described in which there is a single layer-2 switch 20 which is included in the communication network. However, similarly to the second embodiment, the present invention is also applicable to a case where two or more layer-2 switches 20 are included in the communication network. Each of the layer-2 switches 20 operates in the same manner as in the first, third, and fourth embodiments.

As described above, the relay device and the communication network according to the present invention are useful to construct an Ethernet-based FA network.

The configurations described in the above embodiments are only examples of the content of the present invention. The configurations can be combined with other well-known techniques, and a part of each configuration can be omitted or modified without departing from the scope of the present invention.

REFERENCE SIGNS LIST 10X, 10Y communication terminal (master), 10A, 10B, 10C, 10D communication terminal (slave), 20, 20A, 20B layer-2 switch, 20-1, 20-2, 20-3, . . . , 20-$n$, 20A-1, 20A-2, 20B-1 communication port, 21-1, 21-2, . . . , 21-$n$ communication-port reception unit, 22-1, 22-2, . . . , 22-$n$ frame identification unit, 23 loop detection unit, 231 setting unit, 232 monitoring unit, 233 determination unit, 24 frame relay unit, 25-1, 25-2, . . . , 25-$n$ communication-port transmission unit, 30, 30A, 30B hub, 40 network management device.

The invention claimed is:

1. A relay device forming a communication network, the relay device comprising:
   a plurality of communication ports to transmit and receive a frame from a plurality of master communication terminals to a plurality of slave communication terminals;
   a frame identification circuit to identify a specific frame that is transmitted from one of the plurality of master communication terminals in the communication network;
   a setting circuit to set a monitoring cycle for monitoring a number of the specific frames received by the relay device, and a reception threshold for detecting a loop path in the communication network;
   a monitoring circuit to, for each of the communication ports, identify the plurality of master communication terminals that are a source of the specific frame received, and to count the number of the specific frames received from each of the master communication terminals within the monitoring cycle;
   a plurality of counters, each counter associated with a master communication terminal and a communication port;
   a determination circuit to:
      compare a counter value of each counter, which indicates the number of the specific frames from the corresponding master communication terminal and communication port received by the relay device and which is notified from the monitoring circuit, with the reception threshold,
      determine that at least one counter value of at least one counter equals or exceeds the reception threshold;
      detect a loop path at the communication port associated with the at least one counter determined to have the counter value that equals or exceeds the reception threshold, and
      execute control to stop transmission and reception of the frame at the communication port at which a loop path is detected.

2. The relay device according to claim 1, wherein the specific frame is a control frame transmitted from a communication terminal in order to check a state of the communication network.

3. The relay device according to claim 2, wherein information to identify the specific frame and the communication terminal that is a source of the specific frame is a portion of data stored in the frame.

4. The relay device according to claim 2, wherein when there is a plurality of communication ports each of which indicates a counter value equal to or greater than the reception threshold, the determination circuit executes control to stop transmission and reception of the frame at all of the plurality of the communication ports except one of the communication ports.

5. The relay device according to claim 1, wherein information to identify the specific frame and the communication terminal that is a source of the specific frame is a portion of data stored in the frame.

6. The relay device according to claim 5, wherein when there is a plurality of communication ports each of which indicates a counter value equal to or greater than the reception threshold, the determination circuit executes control to stop transmission and reception of the frame at all of the plurality of the communication ports except one of the communication ports.

7. The relay device according to claim 1, wherein when there is a plurality of communication ports each of which indicates a counter value equal to or greater than the reception threshold, the determination circuit executes control to stop transmission and reception of the frame at all of the plurality of the communication ports except one of the communication ports.

8. The relay device according to claim 7, wherein when there is a communication port indicating a counter value equal to or greater than the reception threshold after a predetermined time elapses, the determination circuit further executes control to stop transmission and reception of the frame at the communication port.

9. The relay device according to claim 1, wherein when the determination circuit detects a communication port indicating a counter value equal to or greater than the reception threshold, the determination circuit transmits a notification indicating that a loop path is detected to a management device of the communication network.

10. The relay device according to claim 1, wherein the communication network is a communication network connecting factory automation devices.

11. The relay device according to claim 1, wherein the communication network is a CC-Link IE network.

12. A communication network comprising:
    the relay device according to claim 1; and
    a plurality of communication terminals.

* * * * *